March 18, 1969
A. N. BRUNSON
3,433,571
FOCAL PLANE MICROMETER FOR READING THE SCALES OF ENGINEERING INSTRUMENTS
Filed Oct. 18, 1965
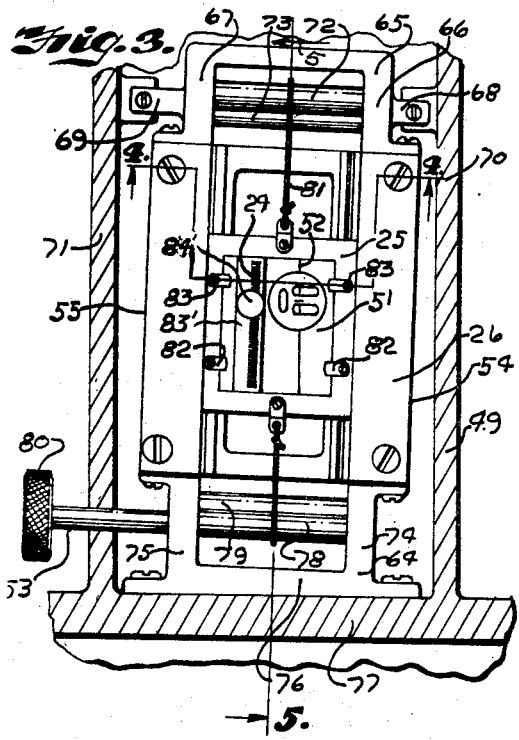
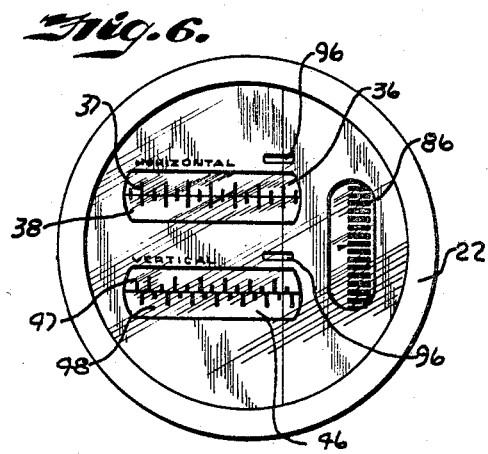
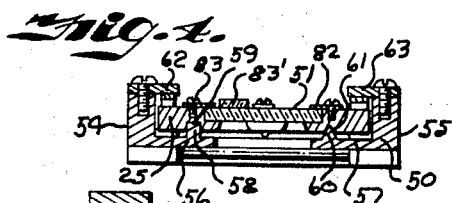
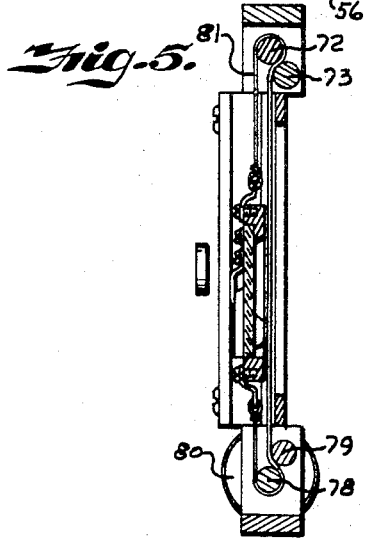
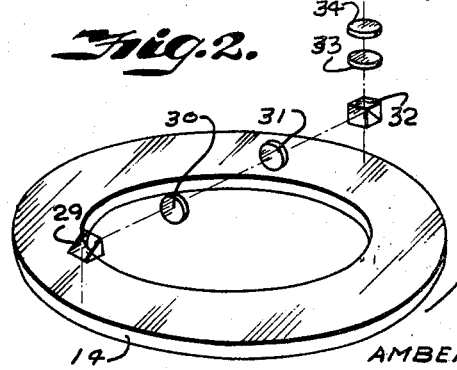
INVENTOR.
AMBER N. BRUNSON
BY
Fishburn and Gold,
ATTORNEYS

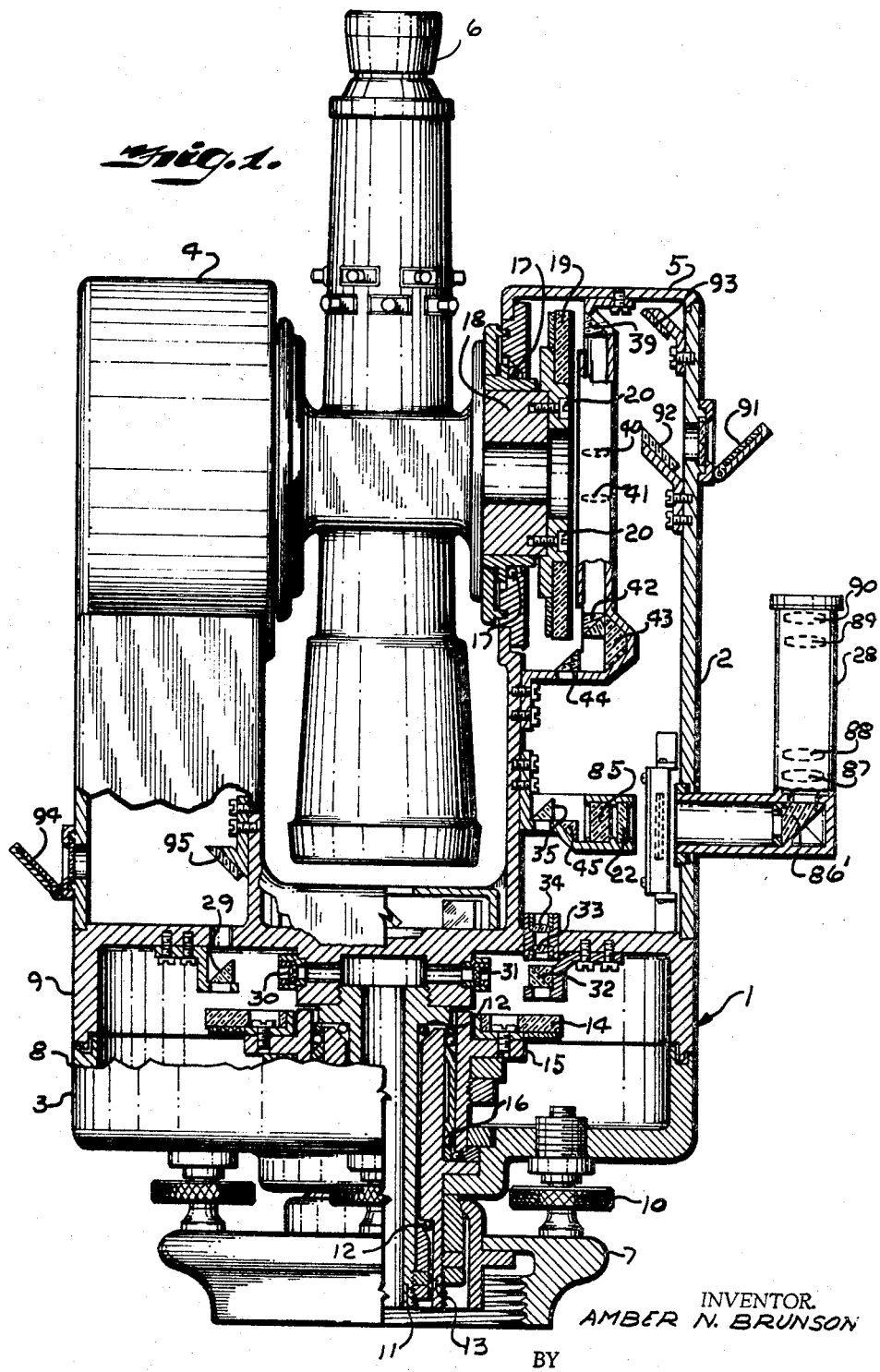

3,433,571
FOCAL PLANE MICROMETER FOR READING THE SCALES OF ENGINEERING INSTRUMENTS
Amber N. Brunson, Kansas City, Mo., assignor to Brunson Instrument Company, Kansas City, Mo., a corporation of Missouri
Filed Oct. 18, 1965, Ser. No. 497,054
U.S. Cl. 356—139     10 Claims
Int. Cl. G01c 1/06; G02b 17/04, 27/02

ABSTRACT OF THE DISCLOSURE

The invention depicts a focal plane micrometer for reading the scales of an engineering instrument, such as a theodolite. The micrometer comprises a fiducial line located on a transparent plate which is slideable along an axis at an acute angle to the line. As the plate slides along its axis the line traverses a path along the divisions of the scale being read. Indicia are provided to indicate the position of the fiducial line.

---

This invention relates to surveying or measuring and more particularly, to an optical reading system for use in surveying or measuring instruments.

The principal objects of this invention are: to provide a new and improved optical system for utilization in the measuring of horizontal and vertical angles; to provide an instrument capable of measuring horizontal and vertical angles to a high degree of accuracy; to provide an optical measuring system wherein all parts of said system are enclosed and substantially protected from the effect of weather; to provide a measuring instrument with an optical system designed to provide oppositely opposed graduation readings from a horizontal or vertical circle utilizing a linear focal plane micrometer to measure the distance of the reading between the separate graduations on the horizontal and vertical circle to provide a high degree of accuracy; to provide a measuring instrument utilizing a linear focal plane micrometer to eliminate the error, inconvenience and cost of the conventional optical wedge, flat or meniscus micrometer and the screw or screw and wedge micrometer; to provide a measuring device which utilizes a linear focal plane micrometer which is not affected by slippage or miscontact since both the fiducial line and the graduations are together on the same piece of glass, as opposed to the prior art devices wherein the graduations are separated from the fiducial line by a mechanical linkage such as a screw contact, screw and nut or gears and worm drive; to provide a measuring device wherein the horizontal and vertical angles may be measured by viewing through the same eyepiece and further, that the micrometer reading may also be taken by viewing through this same eyepiece; to provide a measuring device having one optical system designed to place the image of the graduations of the horizontal and vertical circles on an index glass and a second optical system for placing fractional graduations from a linear focal plane micrometer on the same index glass and a third optical system for conveying the images on the index glass to the instrument operator; to provide an instrument for measuring horizontal and vertical angles having vertical and horizontal circles having graduations thereon, wherein the optical system for reading the vertical and horizontal circles contains a linear focal plane micrometer to determine the fractional portions of the readings when the angle measured is not directly on a graduation, the micrometer being comprised of a slide member mounted for movement in an inclined path behind an index glass with images of the graduation from the horizontal and vertical circle thereon and having a vertically oriented fiducial line thereon and a row of graduations adjacent said fiducial line, said graduations on the slide member being fractional portions of a single unit graduation on the horizontal or vertical circle, the slide member having a precisely inclined path such that movement along said path from a position adjacent its lower graduation to a position adjacent its upper graduation results in a lateral movement of the fiducial line through a single unit graduation of the horizontal and vertical circles whose images are disposed on the index glass in front of the fiducial line, said images and the fiducial line along with the image of the graduations on the slide member being visible through the eyepiece.

Other objects and advantages of this invention will become apparent from the following description taken in connection with the accompanying drawings wherein are set forth by way of illustration and example certain embodiments of this invention.

FIG. 1 is a front elevational view of the theodolite with part of the casing broken away to show the new optical measuring system.

FIG. 2 is a diagrammatic view of the lens systems and the linear focal plane micrometer of the new optical measuring system.

FIG. 3 is a front view of the linear focal plane micrometer.

FIG. 4 is a horizontal cross section taken through the slidably mounted member of the linear focal plane micrometer on line 4—4 of FIG. 3.

FIG. 5 is a vertical cross-sectional view taken along lines 5—5 of FIG. 3.

FIG. 6 is a view through the eyepiece of the theodolite showing the graduation images of the vertical and horizontal circle imposed upon the index glass, the fiducial line and the graduations of the linear focal plane micrometer.

Referring to the drawings in more detail:

The reference numeral 1 generally indicates a theodolite embodying the features of this invention. The theodolite 1, as illustrated, is comprised of a housing 2 which, as illustrated, is U-shaped in cross section having a base portion 3 and leg portions 4 and 5 with a telescope 6 pivotally mounted to leg portions 4 and 5 of the U-shaped housing 2. The theodolite is mounted in a conventional manner in an internally threaded cap member 7 which is, in turn, supported by a tripod or other conventional supporting means (not shown).

The lower portion 3 of the U-shaped housing member 2 is divided into two sections, a leveling head 8 and an instrument frame or alidade 9, to permit both leveling of the instrument and rotation of the instrument about a vertical axis. The level head 8 is supported on cap member 7 by a plurality of level adjustment screws 10 which are utilized in leveling the instrument. The upper section or instrument frame 9 is supported on the cap member 7 by a supporting spindle 11 which is mounted on bearings 12 within hub 13. Supporting spindle 11 is free to rotate within hub 13 thus allowing rotation of the instrument itself about a vertical axis in a full 360-degree rotation.

The horizontal circle 14 is mounted adjacent the supporting spindle 11 and hub 13 on supporting member 15 which is mounted on bearings 16 and free to rotate about hub 13. As the horizontal circuit 14 is independently mounted from the supporting spindle 11, the spindle 11 and instrument frame 9 may be independently rotated relative to horizontal circle 14. When the horizontal circle 14 is fixed in place by conventional means, the rotational displacement of the instrument frame 9 may be measured upon the horizontal circuit 14.

The housing 2 has bearings 17 for supporting the trunnions 18 of the main telescope. The supporting structure is the same on each of the legs 4 or 5 of housing 2. The telescope 6 is thus free to rotate 360 degrees on the bearing surface about a horizontal axis. The vertical circle 19 is secured to the trunnion 18 by means of screws 20 and thus rotates with the rotation of the trunnion 18 and the telescope 6, permitting measurements of the angular displacement of the telescope.

The optical system utilized to read the horizontal circle 14 and the vertical circle 19 is best illustrated in FIG. 2. The optical system is basically comprised of three sub-assemblies of optical units. The first sub-assembly 21 is designed to convey the images of the horizontal circle 14 and the vertical circle 19 to the index glass 22. A second optical sub-assembly 23 is utilized for projecting the image of the graduations 24 on slide 25 of the linear focal plane micrometer 26 to the index glass 22. A third optical assembly 27 is utilized for projecting the images on the index glass 22 through the eyepiece 28 to the viewer.

The first image from the horizontal circle 14 is projected through the right angle prism 29 and convex lenses 30 and 31 to the double right angle prisms 22. At this point, the first image is joined by a second image of the graduations directly opposed on the circle 14 from the graduations of the first image. Both images are then projected through convex lenses 33 and 34 to the right angle prism 35 and then to the image receiving means of index glass 22. The images appear on open space 36 of index glass 22 as an upper image 37 and a lower image 38.

In regard to the vertical circle 19, the first graduation image is projected through the right angle prism 39 and convex lenses 40 and 41 to a double right angle prism 42. The second graduation image from the opposed side of the vertical circle 19 is also projected through double right angle prism 42. Both images are then projected through the reversing prism 43 to the right angle prism 44 and through said prism 44 to right angle prism 45 and from there to the index glass 22. The images of the vertical graduations appear in opening 46 of index glass 22, the first image appearing at 47 and the second image appearing at 48.

If the angle to be read includes a fractional part of one of the graduation units of the horizontal circle 14 or the vertical circle 19, it is necessary to utilize the linear focal plane micrometer 26 shown in FIG. 3 to ascertain the frictional portion of the graduation units on the horizontal circle 14 or vertical circle 19. The micrometer 26 is secured in a mounting structure 49, as illustrated, directly adjacent the eyepiece 28. The micrometer 26 is comprised of a slide member 25 and a carriage 50, glass plate 51 having a fiducial line 52 and graduations 24 thereon said graduation 24 indicating the fractional parts of a single graduation unit on either the horizontal circle 14 or vertical circle 19 and drive mechanism 53 utilized to move the slide in an oblique direction.

The carriage 50 is comprised of two edge portions 54 and 55, each edge portion having a lower inturned lip portion 56 and 57 respectively. Lip portion 56 has extending upwardly therefrom a rectangular slide track 58 for engagement with a correspondingly shaped groove 59 in the slide member 25. Lip 57 has a triangular-shaped slide 60 disposed upwardly for engagement with groove 61 of slide member 25 which is correspondingly shaped. Slide member 25 is disposed between the edge portions 54 and 55 of carriage 50 and engaged to the slide elements 58 and 60 of said edge portions 54 and 55 by grooves 59 and 61. Retaining plates 62 and 63 are secured to the upper side of edge portions 54 and 55 to retain the slide member 25 within the carriage 50 and on slides 58 and 60. The slide member 25 is therefore free to move along slides 58 and 60 but is securely retained within carriage 50.

The carriage 50 is secured to the mounting structure 49 by U-shaped end structures 64 and 65. The legs of each U-shaped end structure 64 and 65 are connected to the edge portions 54 and 55 respectively of the carriage 50. The upper U-shaped end structure 65 has two leg portions 66 and 67 secured to edge portions 55 and 54 respectively and having side extensions 68 and 69. The side extensions 68 and 69 are secured to the vertical elements 70 and 71 respectively of the mounting structure 49. Rods 72 and 73 are disposed between legs 66 and 67 of end structure 65. The ends of rods 72 and 73 are pivotally mounted in legs 66 and 67 of the end structure 65 with said rods 72 and 73 being disposed in abutting relation to one another.

The lower end structure 64 has two leg portions 74 and 75, the ends of which are secured to the edge portions 54 and 55 respectively of the carriage 50. Leg portion 74 is slightly shorter than leg portion 75 with both leg portions being inclined at an acute angle to the horizonal. The base portion 76 of the U-shaped end portion 64 is secured to a horizontal member 77 of the mounting structure 49. The inclination of leg portions 74 and 75 causes the entire focal plane micrometer mechanism 26 to be inclined from the vertical and to the fiducial line 52 and the images in opening 36 and 46 of index glass 22 of the graduations of the horizontal circle 14 and vertical circle 19. The angle of inclination of the slide member 25 to the vertical, as here illustrated, or to the plane of the image of the graduation on the index glass 22, here illustrated as horizontal, is critical to the operation of the micrometer 26. The angle must be designed such that the movement of the slide member 25 along the inclined path previously defined may be related to the lateral movement of the fiducial line 52 across the graduation image on the index glass 22. The graduations 24 on the slide member 25 are fractional portions of a single graduation unit on the index glass; therefore, the movement of the fiducial line 52 across the graduation unit on the index glass 22 must move the slide member along the inclined path a distance equal to one graduation unit as shown on graduations 24 on the slide member 25. Rods 78 and 79 are disposed between leg portions 75 and 74 of the end structure 64 and are pivotally mounted thereto. The lower rod 78 extends through leg portion 75 to a point outside the mounting structure 49 and has a thumb screw head 80 attached thereto, the rods 78 and 79 being disposed in abutting relation to one another.

The slide member 25 is adjusted within the carriage 50 by means of a friction drive comprised of rods 72 and 73 in the upper end support 65 and rods 78 and 79 in the lower end support 64. As illustrated, a cord 81 is attached to the upper portion of the slide member 25 and extends upward over rod 72, then between rods 72 and 73. The cord 81 then extends downward behind slide 25 and is disposed between rods 78 and 79 and around rod 78. The cord 81 then extends upward to be secured to the lower portion of slide member 25. By turning thumb screw 80, sufficient force is created by frictional engagement between the lower rods 78, 79 and the cord 81 that the cord is activated in either direction depending upon the direction of rotation of thumb screw 80, thus causing a relative movement of slide member 25. The upper rod members 72 and 73 serve a holding purpose in this friction drive mechanism, thus retaining the slide position at a certain level by the opposed pressure of the rod member 72 and 73 on cord 81 when thumb screw 80 is not being activated. Glass plate 51 is secured within the slide member 25 by means of four retaining tabs 82 which are secured by screws 83 to the slide member 25. A fiducial line 52, as illustrated, is vertically disposed on the glass plate 51 behind and in alignment with the open portions 36 and 46 in index glass 22. A second glass plate 83' is disposed on top of the glass plate 51 and has graduations 24 marked thereon.

The image of the fractional graduations 24 on plate 83' is projected to the index glass 22 by means of a second optical sub-assembly 23 comprised of a lense 84 and a reversing prism 85 as best shown in FIG. 2. The image of the graduations is shown on the index glass 22 in opening 86 alongside the images 37 and 38 from the horizontal circle 14 and the images 47 and 48 from the vertical circles 19. This allows the operator of the instrument with a single viewing into the eyepiece 28 to obtain the angular reading by degree and fractional part thereof.

The third optical sub-assembly 27 is utilized to relay the images of the graduations from the index glass to the viewer through eyepiece 28. The images of the sets of graduations shown in openings 36, 46 and 86 pass through the index glass 22 to the porro prism 86'. The images then pass through a lens system comprised of lenses 87, 88, 89 and 90 in eyepiece 28.

A series of reflectors 91, 92 and 93 are utilized to provide light to the vertical circle to allow the pickup of the image of the graduations thereon. Reflector 91 is secured to the exterior surface of the housing 2 and reflects light to the interior of the housing 2 and reflector 92, which is so disposed as to relay the light to reflector 93 and from reflector 93 to the vertical circle 19. A similar system is shown for conveying light to the horizontal circle 14. The system is comprised of reflectors 94 and 95.

In obtaining the angular reading from either the vertical circle 19 or horizontal circle 14, the operator merely views into eyepiece 28 where the image shown in FIG. 6 appears. If the angle to be read is an even number such as 46 degrees, the graduation lines will appear as shown in opening 36 of the index glass 22 marked horizontal. In such an instance, the graduation reading from the opposed sides of the horizontal circle 14 will be the same and would be imposed upon the index glass 22 in opening 36 in an aligned manner as shown. The angle to be read will be directly beneath small openings 96. If, however, the angle to be read is not an even angle, but rather an angle and a fractional part thereof such as 46 degrees, 20 minutes, 10 seconds, the readings from the opposite sides of the circle will not appear aligned but will appear as shown in opening 46 of index glass 22 indicated as vertical. For illustration, these graduation readings are from the vertical circle. It is necessary for accurate readings to determine exactly what fractional part of the degree is indicated by the displacement of the graduations in opening 46. To do so, the fiducial line 52 is moved to a point midway between the two opposed readings of 46 degrees. The length of the openings 96 is approximately the length of the lateral displacement of the fiducial line 52 as the slide is moved from its lowermost graduation to its uppermost graduation. The operator moves the fiducial line 52 by operation of thumb screw 80 which, in turn, moves the slide member along an inclined path, causing a lateral movement of the fiducial line 52 in openings 36 and 46 in the index glass 22. The movement of the slide 25 from a reading in opening 86 at its lower most graduation to a reading at its uppermost graduation will move the fiducial line 52 laterally through one single unit graduation shown in either opening 36 or 46 of the index glass 22. The operator moves the fiducial line 52 until it lies midway between the horizontally spaced graduation marks of the angle to be read. The fraction of the angle to be read is then directly read from the graduation 24 on plate member 83 on slide member 25 through opening 86 in the index glass 22. The micrometer 26, in effect, measures the displacement between the graduation of the opposed readings on either the horizontal circuit 14 or vertical circle 19. The exact angle desired to be read will be equal to one half the displacement of the graduation images taken from opposed sides of either the horizontal circle 14 or the vertical circle 19.

It is to be understood that while I have illustrated and described one form of my invention, it is not to be limited to the specific form or arrangement of parts herein described, and shown except insofar as such limitation are included in the claims.

What I claim and desire to secure by Letters Patent is:

1. A device for reading a circle of an engineering instrument wherein the circle is graduated to produce uniform angle defining intervals for indicating the position of parts of the instrument, such reading mechanism comprising, an optical system made up of three optically related sub-assemblies, a first of said sub-assemblies comprising optical units which are normally fixed and serve to project related images of the graduations on the circle from opposed sides of said circle, said first sub-assembly projecting the related images in a defined path, a means for receiving the related images of the graduations from the circle, a means for determining fractional readings of the graduations on the circle having graduations thereon in a row with each indicating a fraction of an interval of graduation on the circle and a fiducial line spaced from said fractional graduations and extending transversely of the circle's graduations on the image receiving means, means for effecting linear movement of said fractional reading means at an acute angle to said fiducial line with said line and said linear movement being related to the graduations of said fractional reading means and the related images of the graduations on the circle whereby said fiducial line is moved along said related images on the image receiving means a distance of one interval of graduation of said images when the linear movement of the fractional reading means equals such an interval as indicated by said fractional graduations, a second optical sub-assembly projecting the image of said fractional graduations to said image receiving means and cooperating with the fractional reading means to serve as an optical micrometer as to the projected images from the circle, and a third optical sub-assembly for viewing said images on the image receiving means.

2. A device for reading the horizontal and vertical circles of engineering instruments which includes an alidade mounted for rotation about a vertical axis and a related horizontal circle having graduations thereon to indicate the relative angular positions of the alidade and a telescope carried on the alidade for rotation about a horizontal axis, and a related vertical circle having graduations thereon to indicate the relative angular positions of the telescope, such reading mechanism comprising, an optical system made up of three optically related sub-assemblies, a first of said sub-assemblies comprising optical units which are normally fixed and serve to project related images of the graduations from opposed sides of the horizontal circle, all mounted within the alidade, a second of said sub-assemblies comprising optical units which are normally fixed and serve to project related images of the graduations from opposed sides of the vertical circle, all mounted within the alidade, said first and second sub-assemblies projecting the respective sets of related images in paths having portions in substantially parallel spaced relation, a means for receiving the related images from the horizontal and vertical circle, fractional reading means having a fiducial line interposed in the path of said sets of related images and extending transversely of said two open areas, said means being associated with graduations in a row with each graduation a fraction of an interval of graduation on the vertical and horizontal circles, a third optical sub-assembly projecting the image of said fractional graduation to said image receiving means, means for effecting movement of the fractional reading means in a path inclined to the fiducial line such that said fiducial line moves laterally along said related images of the graduations of the circles on the image receiving means and said movement being related to the fractional graduations whereby movement of said fiducial line laterally along the images for a distance of one interval of graduation of said circles effects a movement of said fractional graduations whereby the image thereof is projected to the image receiving means and indicates a fractional graduation movement equal to such an interval of circle graduations with the image receiving means cooperating with the line and fractional graduations to serve as an optical micrometer as to either set of projected related images from the vertical and horizontal circles, and a single viewing optical system for viewing said images on the image receiving means.

3. A device for reading the horizontal and vertical circles of engineering instruments which includes an alidade mounted for rotation about a vertical axis and a telescope carried on the alidade for rotation about a horizontal axis, such reading mechanism comprising, an optical system made up of three optically related sub-assemblies, a first of said sub-assemblies comprising optical units which are normally fixed and serve to project related images of the graduations from opposed sides of the horizontal circle, all mounted within the alidade, a second of said sub-assemblies comprising optical units which are normally fixed and serve to project related images of the graduation from opposed sides of the vertical circle, all mounted within the alidade, said first and second sub-assemblies projecting the respective sets of related images in paths having portions in substantially parallel spaced relation, an image receiving means having areas marked thereon and defining two spaced open areas, one receiving the related images from the horizontal circle and the other receiving the related images from the vertical circle, said image receiving means having a third open area at an end of and spaced from said two open areas, said third open area extending at a right angle to said two open areas, fractional reading means having a fiducial line interposed in the path of said sets of related images and extending transversely of said two open areas, said means being associated with graduations in a row with each graduation a fraction of an interval of graduation on the vertical and horizontal circles, a third optical sub-assembly projecting the image of said fractional graduation to said third open area of the index glass, means for effecting movement of the fractional reading means in a path inclined to the fiducial line such that said fiducial line moves laterally along said related images of the graduations of the circle in said first and second open areas of the image receiving means and said movement being related to the fractional graduations whereby movement of said fiducial line along the images for a distance of one interval of graduation of said circles effects a movement of said fractional graduations whereby the image thereof in the third open area indicates a fractional graduation movement equal to such an interval of circle graduation with the image receiving means cooperating with the fiducial line and fractional graduations to serve as an optical micrometer as to either set of projected images from the vertical and horizontal circles, and a single viewing optical system for viewing said images on the index glass.

4. A device as recited in claim 2 wherein the image receiving means is an index glass.

5. A device for reading the horizontal and vertical circles of engineering instruments which includes an alidade mounted for rotation about a vertical axis and a telescope carried on the alidade for rotation about a horizontal axis, such reading mechanism comprising, an optical system made up of three optically related sub-assemblies, a first of said sub-asemblies comprising optical units which are normally fixed and serve to project related images of the graduations from opposed sides of the horizontal circle, all mounted within the alidade, a second of said sub-assemblies comprising optical units which are normally fixed and serve to project related images of the graduation from opposed sides of the vertical circle, all mounted within the alidade, said first and second sub-assemblies projecting the respective sets of related images in paths having portions in substantially parallel spaced relation, a means for receiving the related images from the horizontal and vertical circles, a slide interposed in said path of the related images and movable in a plane normal to said path, a fiducial line on said slide extending transversely of the images on the image receiving means, graduations on said slide in a row spaced laterally of said line with each indicating a fraction of an interval of graduation on the vertical and horizontal circles, means for effecting linear movement of said slide in the plane thereof and at an acute angle to said fiducial line with said line and said linear movement being related to said fractional graduations on said slide whereby said fiducial line is moved laterally along the related images on the image receiving means a distance of one interval of graduation of said related images when the linear movement of the slide equals such an interval as indicated by said fractional graduations thereon, a third optical sub-assembly projecting the image of said fractional graduations to the image receiving means and cooperating with the slide to serve as an optical micrometer as to either set of projected related images from the vertical and horizontal circles, and a single optical viewing system for viewing said images on the image receiving means.

6. A device for reading the horizontal and vertical circles of engineering instruments which includes an alidade mounted for rotation about a vertical axis and a telescope carried on the alidade for rotation about a horizontal axis, such reading mechanism comprising, an optical system made up of three optically related sub-assemblies, a first of said sub-assemblies comprising optical units which are normally fixed and serve to project related images of the graduations from opposed sides of the horizontal circle, all mounted within the alidade, a second of said sub-assemblies comprising optical units which are normally fixed and serve to project related images of the graduations from opposed sides of the vertical circle, all mounted within the alidade, said first and second sub-assemblies projecting the respective sets of related images in paths having portions in substantially parallel spaced relation, an image receiving means having areas marked thereon and defining two spaced open areas, one receiving the related images from the horizontal circle and the other receiving the related images from the vertical circle, said image receiving means having a third open area at an end of and spaced from said two open areas, said third open area extending at a right angle to said two open areas, a slide interposed in said path of the two sets of related images and movable in a plane normal to said path, a line on said slide extending transversely of said two open areas, graduations on said slide in a row spaced laterally of said line with each indicating a fraction of an interval of graduations on the vertical and horizontal circles, means for effecting linear movement of said slide in the plane thereof and at an acute angle to said fiducial line with said line and said linear movement being related to said fraction graduations on said slide whereby said fiducial line is moved along the sets of related images in said two open areas a distance of one interval of graduation of said images when the linear movement of the slide equals such an interval as indicated by said fractional graduations, a third optical sub-assembly projecting the image of said fractional graduations to said third open area of the image receiving means and cooperating with the slide to serve as an optical micrometer as to either set of projected related images from the vertical and horizontal circles, and a single optical viewing system for viewing said images on the image receiving means.

7. A device as recited in claim 6 wherein the image receiving means is an index glass.

8. In a theodolite having a telescope and a circle graduated to produce uniform angle defining intervals for indicating the position of the telescope, an angle position reading system comprising, an optical system for producing two juxtaposed images of graduations on diametrically opposite portions of the circle, said circle and optical system being relatively rotatable about the axis of said circle, a micrometer slide interposed in the path of light that produces said juxtaposed images, said slide being in a plane normal to said path of light, said slide having a fiducial line in said plane and extending generally transversely of said images, a carriage supporting and guiding said slide and defining a path of movement thereof in said plane and at an acute angle to said fiducial line whereby movement of said slide effects lateral movement of the crossing point of the fiducial line and said images, a micrometer scale on said slide laterally spaced from and longitudinally of said fiducial line, an index glass adjacent said slide and in the path of light producing said images, a second optical system imaging the micrometer scale on said index glass to indicate the position of said fiducial line and the position of the telescope in fractions of said interval, and a single viewing means for said line and images.

9. An angle position reading system as set forth in claim 8 wherein said micrometer scale has graduations in fractions of said interval arranged relative to the angle of the path of movement of the slide and said line whereby movement of said slide for a length of the fraction graduations indicating a total of an interval moves the line laterally of the circle images a distance corresponding to one interval in the graduations of said images.

10. An angle position reading system as set forth in claim 9 wherein the optical system for producing the two juxtaposed images include wedge prisms arranged whereby the graduations of the two images register.

References Cited

UNITED STATES PATENTS 2,363,877  11/1944  Larsen et al.
2,757,567  8/1956  Hillman et al.

JEWELL H. PEDERSEN, *Primary Examiner.*

W. A. SKLAR, *Assistant Examiner.*

U.S. Cl. X.R.

33—1, 46; 350—112